(12) United States Patent
Chao et al.

(10) Patent No.: US 6,904,170 B2
(45) Date of Patent: Jun. 7, 2005

(54) METHOD AND SYSTEM FOR DOCUMENT SEGMENTATION

(75) Inventors: Hui Chao, San Jose, CA (US); Dan Bloomberg, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 586 days.

(21) Appl. No.: 10/150,362

(22) Filed: May 17, 2002

(65) Prior Publication Data

US 2003/0215136 A1 Nov. 20, 2003

(51) Int. Cl.[7] .................................................. G06K 9/34
(52) U.S. Cl. ....................... 382/174; 382/176; 382/179; 382/281
(58) Field of Search ............................... 382/174, 176, 382/179, 199, 281, 290

(56) References Cited

U.S. PATENT DOCUMENTS

| | | | | |
|---|---|---|---|---|
| 5,517,586 A | * | 5/1996 | Knowlton | ................... 382/292 |
| 5,570,435 A | * | 10/1996 | Bloomberg et al. | ......... 382/283 |
| 6,108,444 A | * | 8/2000 | Syeda-Mahmood | ......... 382/186 |
| 6,687,421 B1 | * | 2/2004 | Navon | ........................ 382/289 |

* cited by examiner

Primary Examiner—Phuoc Tran

(57) ABSTRACT

A method of document segmentation. Specifically, one embodiment of the present invention discloses a method of document segmentation that performs a plurality of projection profiles of pixel intensities on a document containing a plurality of text lines over a range of angles. A plurality of slope values for a plurality of discrete distances perpendicular to said range of angles is calculated for the plurality of projection profiles. A set of maximum absolute slope values is sorted out from the plurality of slope values. Text lines of first and second type are identified by setting a threshold slope value. Absolute slope values greater than the threshold slope value indicate the plurality of text lines of said first type. Absolute slope values less than the threshold slope value indicate the plurality of text lines of a second type.

29 Claims, 10 Drawing Sheets

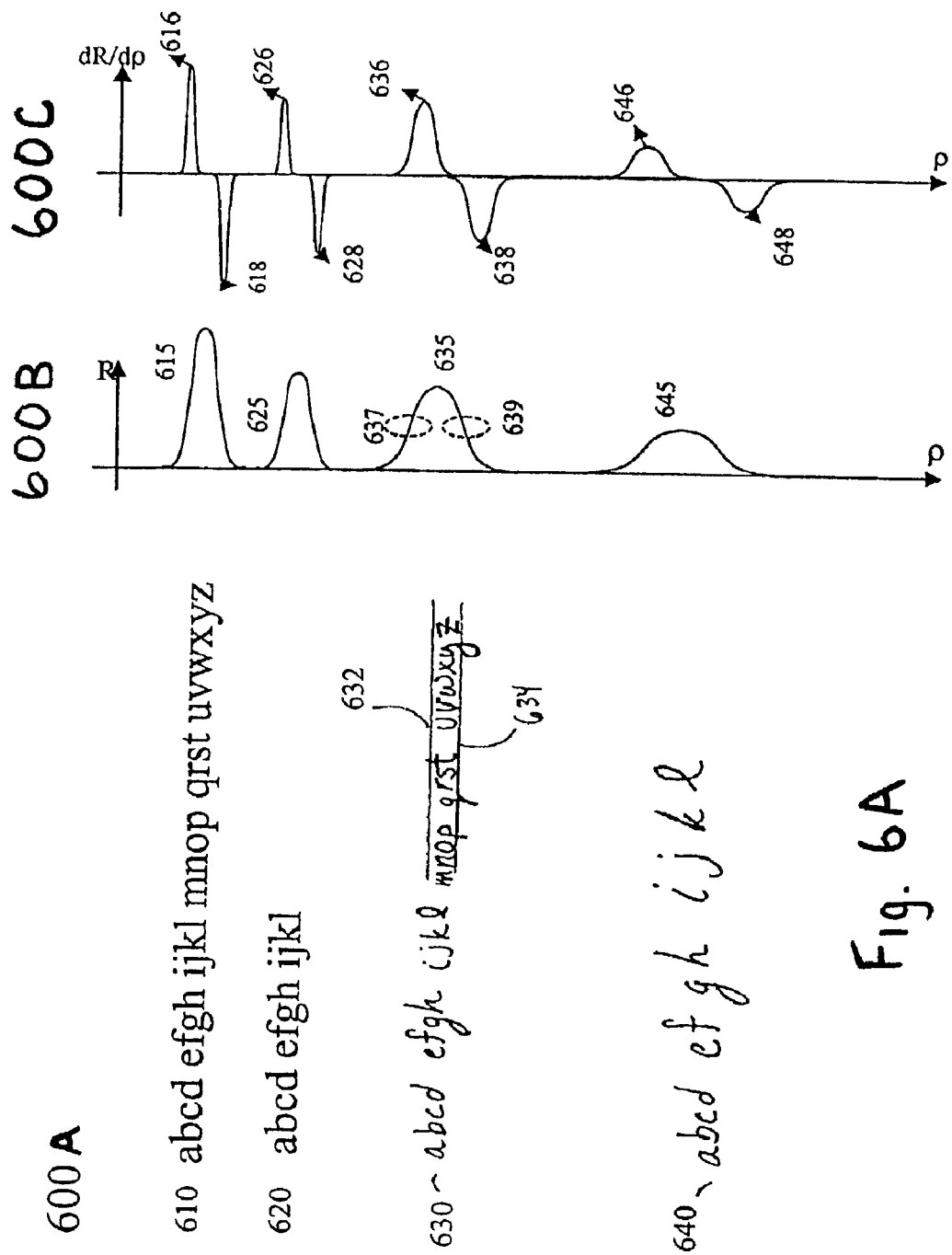

METHOD AND SYSTEM FOR DOCUMENT SEGMENTATION

TECHNICAL FIELD

The present invention relates to the field of image processing, and more particularly to a method for separately identifying machine printed text and hand-written text within a document.

BACKGROUND ART

Document, or page, layout analysis is a document processing technique used to determine the physical and logical structures of a document in terms of the geometric, spatial and functional relationships of its document components, and in particular, its text document components. Its typical purpose is to automatically transform document structures from a nonelectronic medium, like paper, into an electronic medium. One particular application for document processing techniques is for identifying a particular sample document, that is digitized, as one of a number of documents. This particular feature is most applicable for document sorting.

In order to compare and identify sample documents to one of a set of original documents, some techniques compare the overall features of the text within a sample document to the features exhibited by the original documents in the set of original documents. In order to perform the comparison, the sample document must be presented in an orientation that is as close as possible to the orientation of the original document, one of which involves de-skewing the digitized sample document. Another involves comparing similar machine printed text in the sample document and the original document. In this case, both the sample document and the original document can be compared to each other with text that is horizontally oriented, for example.

Prior art techniques exist for determining the global skew angle of a sample document. Text within a document when transferred to digitized form may be skewed in its alignment with the page outline of the document. This skewing may occur for many reasons, e.g., an angled presentation of the document in the scanner, a document that contains copied text that is skewed within the document, etc.

Segmentation of handwritten text from the machine printed text in a sample document may be necessary to determine the global skew angle of the machine printed text in the sample document. The global skew angle can be calculated by subtracting out the handwritten text from the machine printed text in the sample document. In this way, the global skew angle of the sample document can be determined from the remaining machine printed text.

However, when a document contains a mixture of machine printed text and handwritten text, the prior art techniques for determining a global skew angle of a document can be unreliable, especially if the handwritten text dominates within the document. Handwritten text may occur in the form of annotations on an original document. For example, on a form, questions are presented in machine printed text; however, answers to the text are presented in handwritten annotations.

Furthermore, prior art techniques for segmenting machine printed text from handwritten text for comparing sample documents to original documents and for determining a global skew angle of machine printed text can also be unreliable. One prior art technique involves the identification of machine written text within a sample document using morphological operations. The handwritten text is obtained by subtracting out the machine written text. However, this morphological technique can only work within a certain size range of the machine text for identifying the machine text. Additionally, with the subtraction procedure, if graphics were present within the original document, the handwritten text would be mixed with the graphics. As such, the handwritten text would still not be identified. Also, the morphological technique is deficient in determining local skew angles for particular lines of text.

Therefore, prior art methods of segmentation were unable to completely perform segmentation of handwritten text and machine printed text, especially if the sample document contained graphic information. Moreover, prior art techniques indirectly identified handwritten information in a sample document and therefore suffered from imprecise delineation between machine printed text, handwritten text, and graphics.

DISCLOSURE OF THE INVENTION

A method of document segmentation is disclosed. Specifically, one embodiment of the present invention discloses a method of document segmentation that generates projection profiles of pixel intensities on a document containing text lines over a range of angles. Slope values for discrete distances perpendicular to the range of angles are calculated for the projection profiles. A set of maximum absolute slope values is sorted out from the slope values. Text lines of a first and second type are identified by setting a threshold slope value. Absolute slope values greater than the threshold slope value indicate the plurality of text lines of a first type. Absolute slope values less than the threshold slope value indicate the plurality of text lines of a second type.

BRIEF DESCRIPTION OF THE DRAWINGS

FIG. 6A is a diagram illustrating machine printed and handwritten text lines of an exemplary sample document, in accordance with one embodiment of the present invention.

FIG. 6B is a diagram illustrating projection profiles of the associated text lines in FIG. 6A, in accordance with one embodiment of the present invention.

FIG. 6C is a diagram of the derivative functions of the associated projection profiles of FIG. 6B, in accordance with one embodiment of the present invention.

BEST MODES FOR CARRYING OUT THE INVENTION

Figure 1:
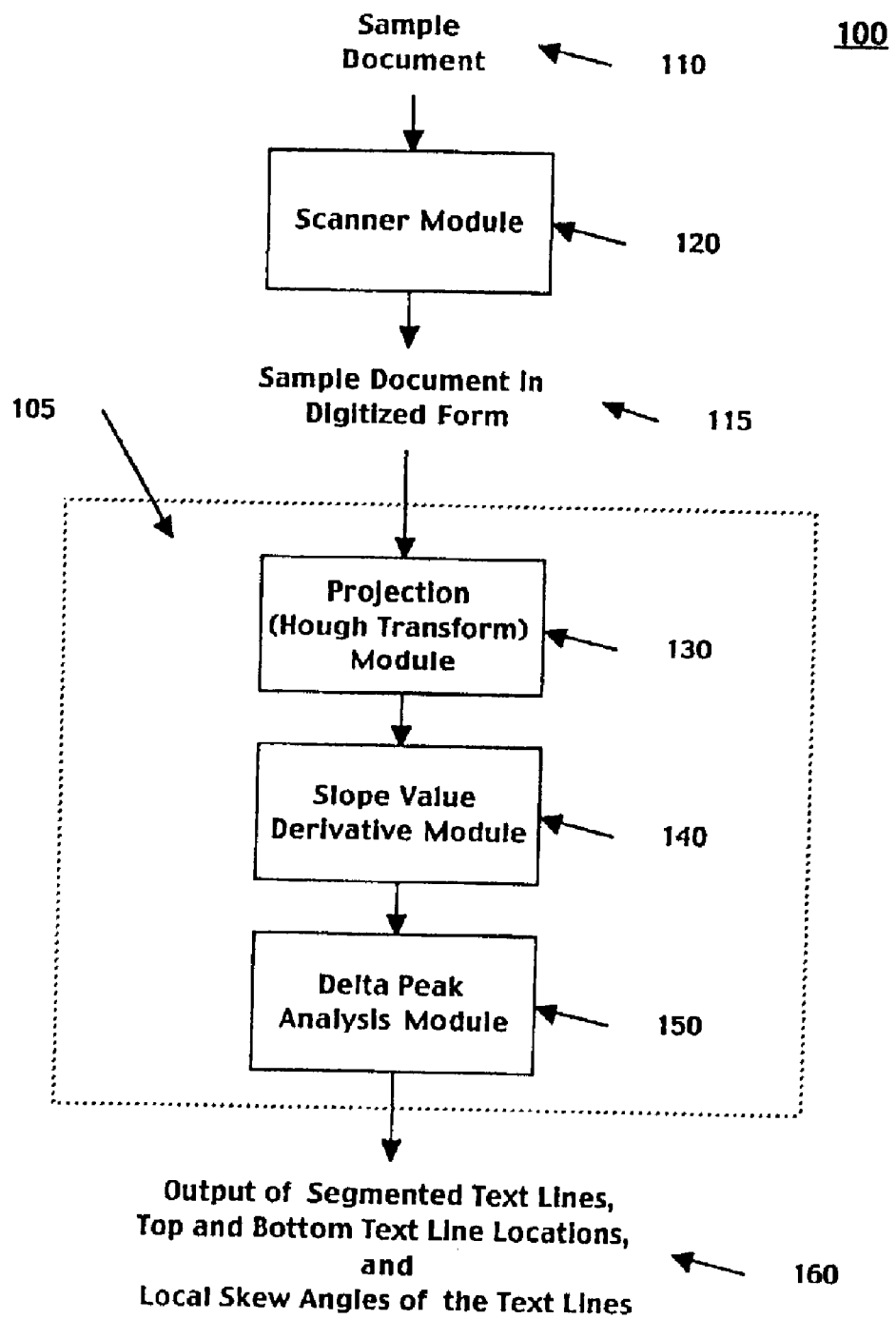
FIG. 1 is a schematic block diagram of an exemplary system for implementing a method of document segmentation, in accordance with one embodiment of the present invention.

Reference will now be made in detail to the preferred embodiments of the present invention, a method of document segmentation. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for providing document segmentation. In one embodiment, the computer system includes a processor coupled to a bus and memory storage coupled to the bus. The memory storage can be volatile or non-volatile and can include removable storage media. The computer can also include a display, provision for data input and output, etc.

Accordingly, the present invention provides a method and system for document segmentation. The present invention generates projection profiles of a document containing various types of text lines. The present invention is able to delineate between the various types of text lines by determining and analyzing slope values of the projection profiles and sharpness of slope transitions for the top (x-height) lines and bottom (baselines) lines of associated text lines in a sample document. The present invention provides document results by positively identifying each of the various types of text lines. Because of the positive identification, the present invention is significantly more reliable than previous techniques in the prior art that relied on identifying only one of the various types of text lines in a sample document and subtracting out the identified text to locate the various other types of text. More specifically, the present invention is able to positively identify machine printed text lines and handwritten text lines by analyzing the slope values of the projection profiles and sharpness of slope transitions.

While embodiments of the present invention are described within the context of segmenting machine printed text lines from handwritten text lines (e.g., handwritten annotations), other embodiments are well suited to segmenting other types of text lines or graphics.

FIG. 1 is a block diagram illustrating a system 100 capable of performing document segmentation. More specifically, system 100 includes a scanning module 120. The scanning module 210 inputs a sample document 110 and outputs the digitized sample document 115. The digitized sample document 115 is then inputted into electronic system 105 for performing document segmentation.

Electronic system 105 includes a projection module 130 for receiving the digitized sample document 115 for developing a plurality of projection profiles. In one embodiment, the projection profiles are obtained through Hough transforms.

Electronic system 105 also includes a derivative module 140 for calculating slope values of the plurality of projection profiles. The derivative module 140 provides a first degree of document segmentation, such as, when segmenting machine printed text lines from handwritten text lines.

Electronic system 105 also includes a delta peak analysis module 150 for calculating the sharpness of the slope transitions obtained from the derivative module 140. The delta peak analysis module 150 provides for a second degree of document segmentation, such as, when segmenting machine printed text lines from handwritten text lines.

The delta peak analysis module 150 provides an output 160 that segments the text lines of the digitized sample document 115. The output 160 also indicates the tops and bottoms of the text line locations, and local skew angles of the text lines.

Figure 2:
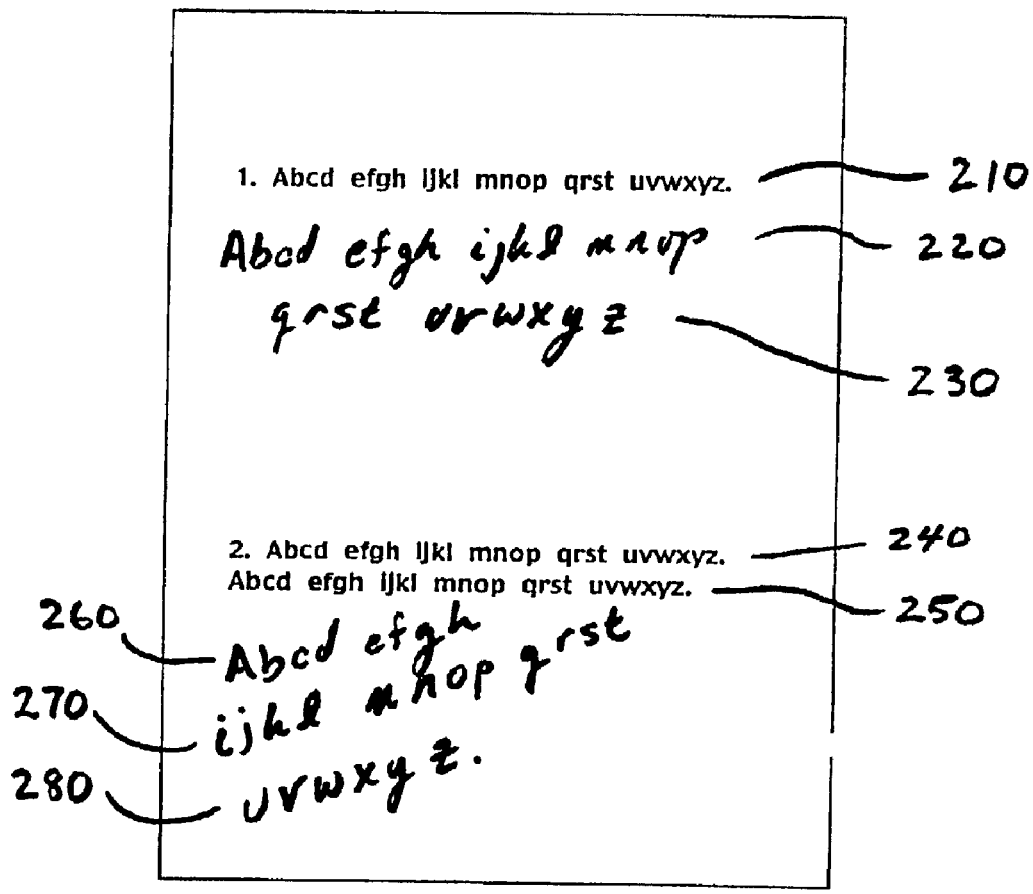
FIG. 2 is a diagram of a document illustrating machine printed text lines and handwritten text lines of annotations, in accordance with one embodiment of the present invention.

FIG. 2 is a diagram of the exemplary sample document 110 as shown in FIG. 1. Sample document 110 includes a plurality of text lines including a plurality of machine printed text lines and a plurality of handwritten text lines, or handwritten lines of annotations. By way of illustration, lines 210 240, and 250 illustrate machine printed text lines. On the other hand, lines 220, 230, 260, 270, and 280 illustrate handwritten text lines.

Figure 3:
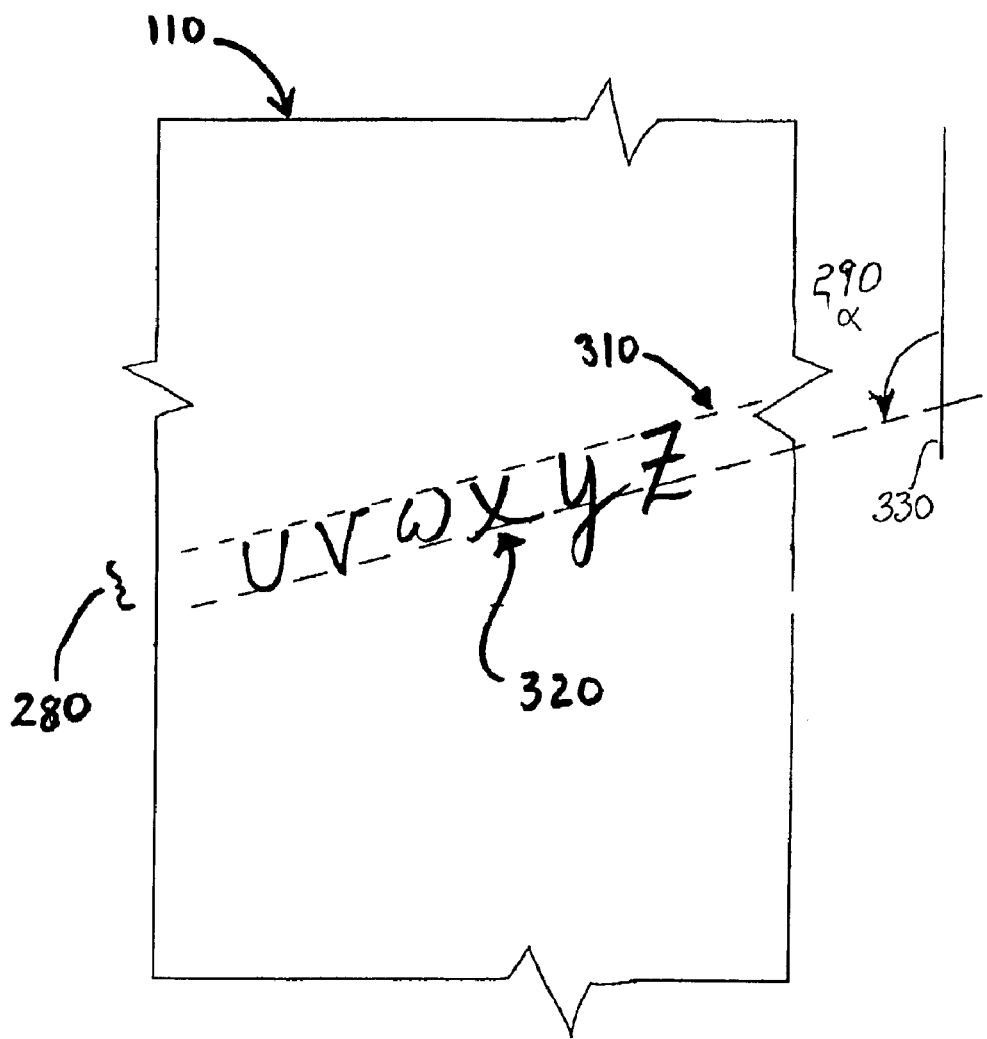
FIG. 3 is a diagram of an exemplary text line illustrating top and bottom lines of the text line and a skew angle for the text line, in accordance with one embodiment of the present invention.

FIG. 3 is a diagram isolating the handwritten text line 280 of the sample document 110. FIG. 3 illustrates a top (x-height) line 310 that is the average of the maximum heights of all the letters of the handwritten text line 280. FIG. 3 also illustrates a baseline 320 from which the text line 280 is written. Baseline 320 is calculated as the approximate or average position from which each of the letters of the handwritten text line 280 is written from.

While the present invention is described using illustrations of top lines (x-height lines) and baselines of handwritten text lines, it is appreciated that x-height lines and baselines are also associated with machine printed text lines.

FIG. 3 also illustrates a vertical line 330 for orienting text lines to the physical page of the sample document 110. For example, handwritten text line 280 has a local skew angle α

290 that is shown. Each of the plurality of text lines in the sample document 110 is associated with a local skew angle that orients the text line to the y-axis (zero degrees) of the physical page. For a horizontal line, the local skew angle is ninety degrees. For handwritten text line 280, a local skew angle α 290 is shown. In general, the skew angle is used for adjusting the associated text line to a horizontal position with respect to the physical page of the sample document 110.

Figure 4:
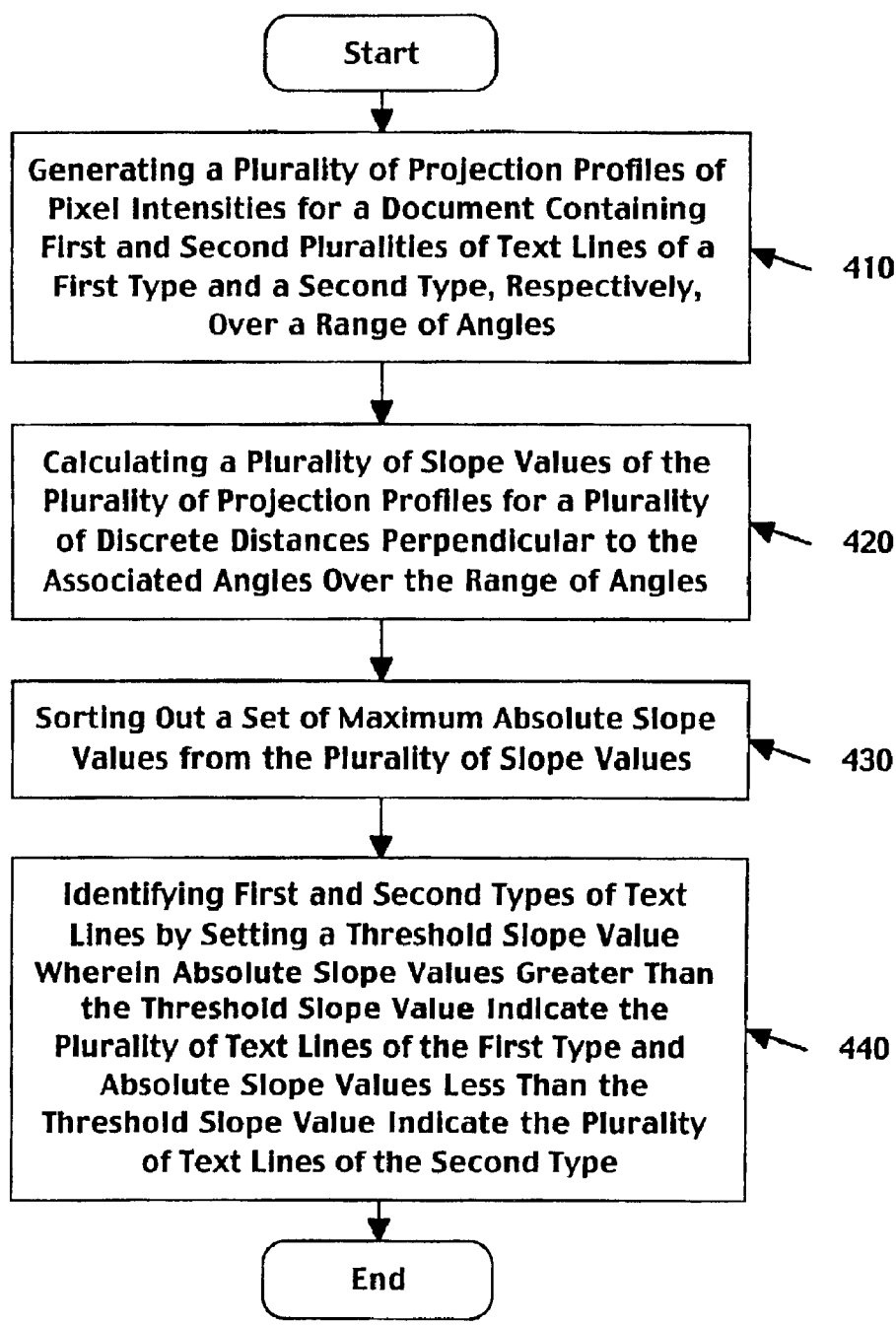
FIG. 4 is a flow diagram illustrating steps in a method of document segmentation, in accordance with one embodiment of the present invention.

FIG. 4 is a flow chart 400 of the overall process illustrating steps in an exemplary method of providing document segmentation, in accordance with one embodiment of the present invention. The present embodiment begins by generating a plurality of projection profiles on a digitized sample document (e.g., sample document 115) in step 410. The digitized sample document contains a plurality of text lines including a plurality of text lines of a first type and a plurality of text lines of a second type. The plurality of text lines of the first type exhibit more uniformity between all of the letters on the sample document than the plurality of text lines of the second type. In one embodiment, the text lines of a first type are machine printed text lines, and the text lines of a second type are handwritten text lines of annotations.

The projection profiles are generated to obtain over a range of angles the sum of pixel intensities along projection lines. A projection profile is generated for angles within the range of angles. In one embodiment, a projection profile is generated every quarter of a degree; however, it is appreciated that other embodiments are well suited to generating projection profiles with angle variations other than one quarter of a degree.

Figure 5A:
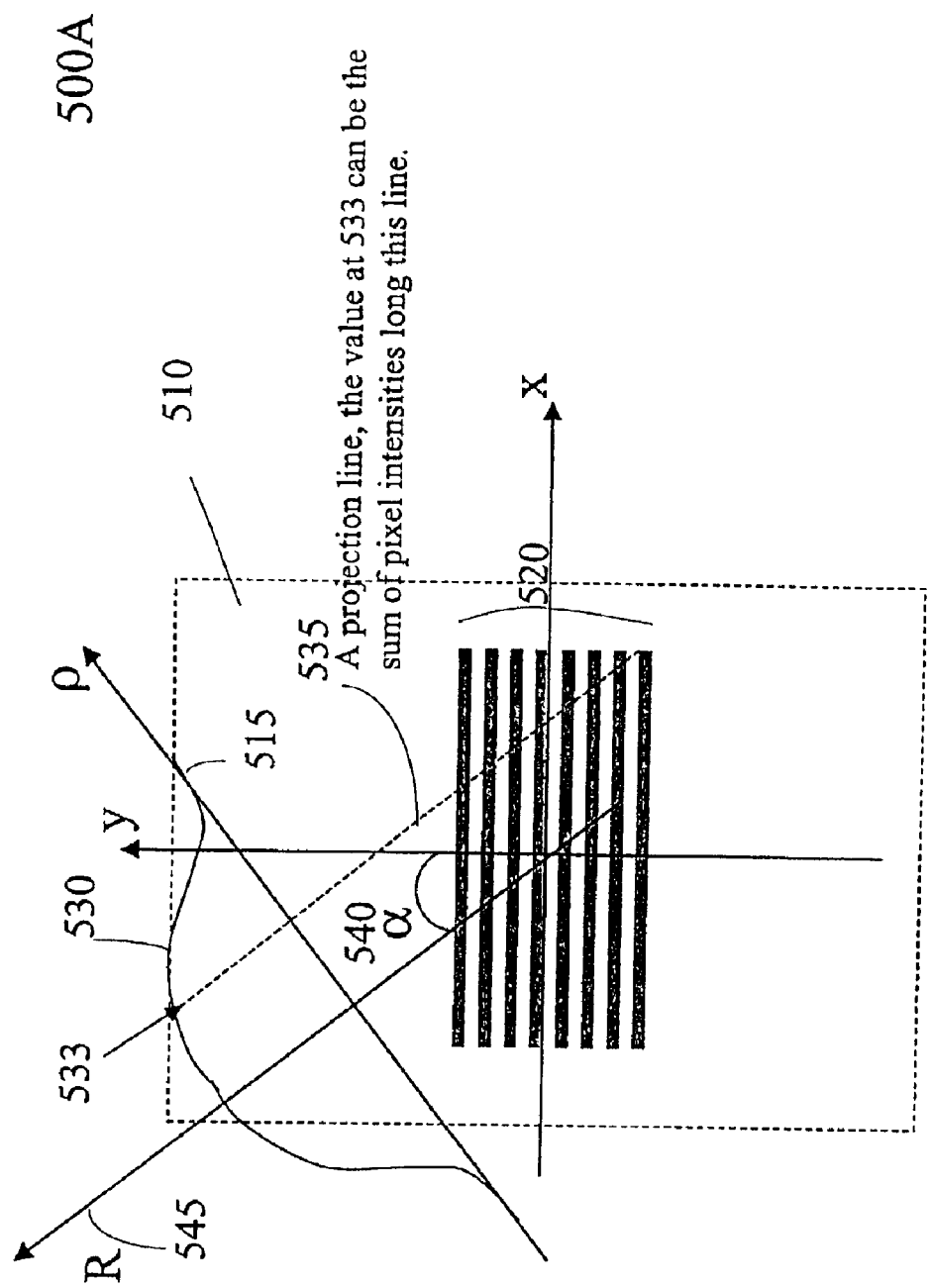
FIG. 5A is a diagram of a projection profile along a first angle, in accordance with one embodiment of the present invention.
Figure 5B:
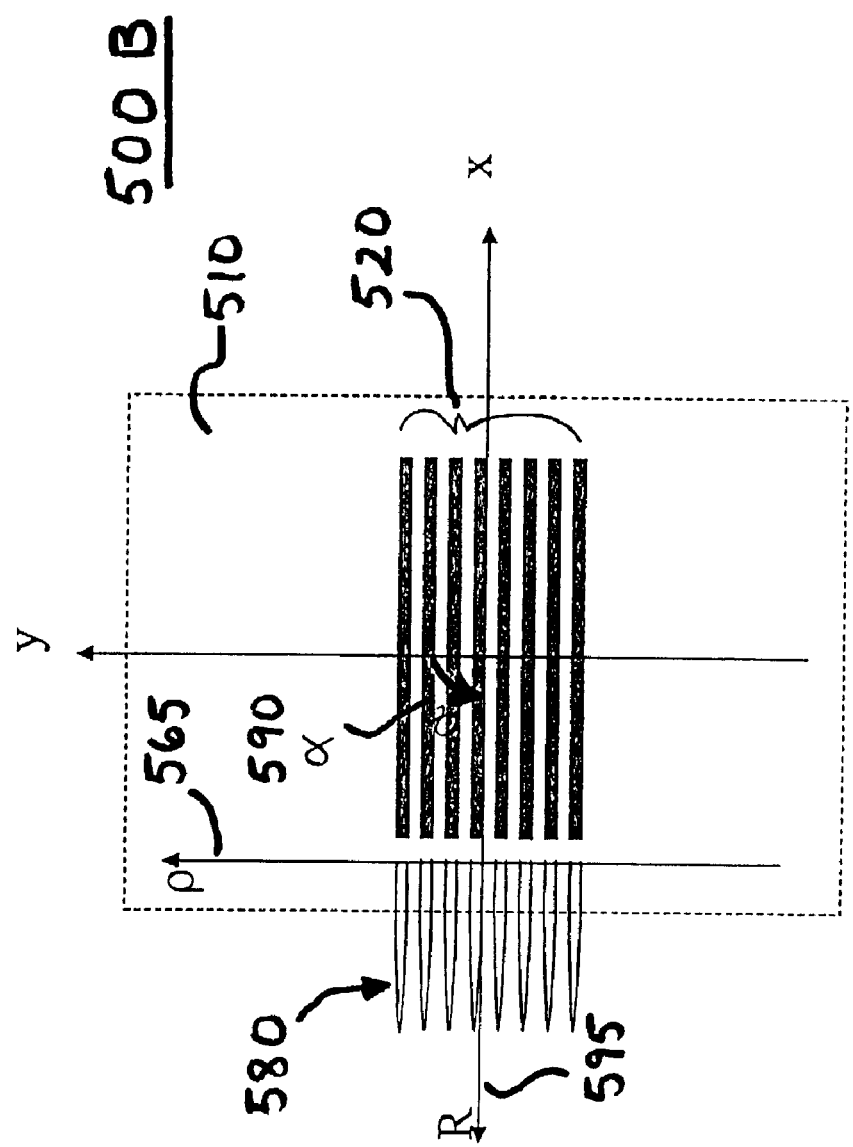
FIG. 5B is a diagram of a projection profile along a second angle, in accordance with one embodiment of the present invention.

In addition, the range of angles is user defined. In one embodiment, the range of angles is plus and minus 10 degrees off of the horizontal line of 90 degrees. As such, the range of angles is between 80 to 100 degrees. FIG. 5A and FIG. 5B are plot diagrams 500A and 500B, respectively, illustrating two projection profiles at two different angles for a sample document 510. Sample document 510 includes an exemplary set 120 of text lines. The exemplary set 120 of text lines can contain handwritten text lines and machine printed text lines.

FIGS. 5A and 5B also illustrates sample document 510 oriented in x-y coordinates, and the projection profiles transformed into angle α and distance ρ space. In both FIGS. 5A and 5B, the x-y coordinates are centered at the center of the physical page of the sample document 510.

In the plot diagram 500A of FIG. 5A, a projection profile is generated for angle α 540 that is approximately 40 degrees. Angle α 540 defines the line 545 for defining the coordinate space for the projection profile R. In addition, the coordinate space is defined by the line 515 that is perpendicular to line 545. Line 515 defines the distance ρ from the intersection of lines 545 and 515.

The projection profile R is illustrated by the curve 530. The projection profile R represents the sum of pixel intensities along projection lines at a certain angle (in this case angle α 540) as a function of the distance ρ. For example, the value at point 533 of the projection profile R represents the sum of pixel intensities along the projection line 535 at the angle α 540. In another interpretation, the projection profile R is the sum of the non-zero pixels along the projection line at a certain angle (in this case angle α 540). As shown in FIG. 5A, the projection profile, at each of the distances p gets contribution from each of the text lines in set 520. As such, the projection profile as shown by curve 530 does not distinguish any of the lines.

In one embodiment, the projection profiles of the sample document 510 are generated with a Hough transform function, which computes the projection of the image intensity along a radial line that is oriented at a specific angle α. In the present embodiment, the Hough transform will give the pixel density along a radial line that is oriented at a specific angle α. FIGS. 5A and 5B illustrate the Hough transform function for the various angles α 540 and α590.

The Hough transformation operation transforms a function from x-y space to α-ρ space, and is defined by equation (1) as follows:

$$R(\alpha, \rho) = \int_{x,y} \int f(x, y)\delta(x\cos\alpha + y\sin\alpha - \rho) dx dy \tag{1}$$

The delta function in Equation (1) has meaning only within an integral. Integrating over a delta function extracts the value(s) of the function f(x,y) where the argument of the delta function goes to zero (e.g., δ(0)). For each value of α and ρ, δ(0) is defined over a straight line, a projection line, that satisfies the following equation:

$$y = g(x) = \rho/\sin(\alpha) - x(\cot\alpha(\alpha)) \tag{2}$$

The double integral in Equation (1) integrates (or sums, in the discrete case) all the values of f(x, g(x)) along the line as defined in Equation (2).

In FIG. 5B, diagram 500B illustrates a projection profile for angle α 590 that is approximately 90 degrees. Angle α 590 defines the line 595 for defining the coordinate space for the projection profile R. In addition, the coordinate space is defined by the line 565 that is perpendicular to line 595. Line 565 defines the distance ρ from the intersection of lines 595 and 565.

The projection profile R is illustrated by the curve 580. The projection profile is the sum of pixel intensities taken along a projection line at a certain angle (in this case angle α 590) as a function of distance ρ. As shown in FIG. 5B, the projection profile, as defined by curve 580 has multiple peaks. At the angle α 590, at each value of the distances ρ, the projection profile R gets contribution from at most only one of the text lines in set 520. As such, the projection profile as shown by curve 580 is able to distinguish each of the text lines in the set 520.

Returning now back to FIG. 4, after generating the projection profiles for each of the angles, as defined by a user, within the range of angles, the present embodiment then proceeds by calculating a plurality of slope values, in step 420. For each of the projection profiles R that were generated in step 410, slope values, represented as the first derivative of the projection profile dR/dρ((α), are calculated at discrete distances ρ, along the line that is perpendicular to the line defined by the associated angle α. The slope values are calculated for every projection profile generated over the range of angles. In one embodiment, the slope values are calculated from derivative functions of the projection profiles R. In another embodiment, the slope values are calculated by taking the difference between two R values in a projection profile over a delta distance Δρ.

The present embodiment then searches for the local maximal derivatives in the projection profiles. As such, in step 430, the present embodiment sorts out a set of maximum absolute slope values from the plurality of slope values that were generated over all the projection profiles in step 420. The derivatives R'=dR/dρ(α, ρ) of the projection profile R((α, ρ) resulting from the Hough transform can be presented as a two dimensional array. The present embodiment finds each of the lines of text and their associated skew angles from the two-dimensional array. To find the location of a text line, which covers some range of values of ρ, and its associated skew angle, which is the best representative value of α, the present embodiment first sorts through the two-dimensional array to find, for each ρ, the value of α that maximizes R'. A one-dimensional array of R'(ρ) of those maximum values, MaxR'(ρ), can be obtained. Furthermore, an associated one-dimensional array of values of cc can be obtained, Max_α(ρ), which gives the best representative α that maximizes R' at each value of ρ, MaxR'(ρ). The present embodiment then sorts the two 1-dimensional arrays simultaneously to pick out the peaks in MaxR'(ρ) and associated angles in Max_α(ρ). Text lines can be located from those peaks in the array, at some set of values {ρ1, ρ2, . . . ). The associated Max_α (ρ1), Max_α (ρ2), . . . gives the skew angles of respective text lines.

The peaks R'(Max_α (ρi), ρi) or the local maximal derivatives correspond to top (x-height) lines and bottom (baselines) lines that define associated text lines in the set of text lines of a sample document. In one embodiment, the maximum derivative that was originally positive is associated with the x-height line of the text line, and the maximum derivative that was originally negative is associated with the baseline of the text line.

Furthermore, the maximum absolute slope values are associated with a certain angle α for the corresponding text line. The associated angle α is the local skew angle for the corresponding text line.

By looking at the maximum derivatives, the present embodiment takes advantage of the sloppiness and unevenness exhibited by handwritten text as compared to machine printed text. The derivative is able to distinguish between the top (x-height lines) and bottom (baseline) edges of the various text lines of a sample document.

FIG. 6A is a diagram 600A illustrating lines of text from a sample document. The sample document contains machine printed text lines 610 and 620. The sample document also contains handwritten text lines 630 and 640.

FIG. 6B is a diagram 600B illustrating the projection profiles R (615, 625, 635, and 645) of the associated text lines of FIG. 6A. Projection profile R 615 is associated with text line 610, projection profile 625 is associated with text line 620, projection profile 635 is associated with text line 630, and projection profile 645 is associated with text line 640. Each of the projection profiles are representative of associated angles α.

FIG. 6C is a diagram 600C illustrating the derivative functions dR/dρ for each of the projection profiles (615, 625, 635, and 645) of FIG. 6B at their associated angles α. Diagram 600C also illustrates maximal derivative values at points 616, 618, 626, 628, 636, 638, 646, and 648 in the derivative functions. The local maximal derivative values represent the locations of the x-height lines and the baselines of associated text lines at their associated angles α. For example, the positive slope of the projection profile 635, as shown in highlighted area 637, is represented as peak values at point 636 in the associated derivative function dR/dρ, and corresponds to the x-height line 632. Also, the negative slope of the projection profile 635, as shown in highlighted area 639, is represented as peak values at point 638 in the associated derivative function dR/dρ, and corresponds to the baseline 634.

In general, the derivative function of the projection profile is a function of the length of the text line and its uniformity over the associated text line. In one embodiment, the derivative function of a projection profile of a sample document is taken. Diagram 600 illustrates machine text lines 610 and 620. Because machine text lines are uniform over all the letters within the text line, the derivative function will exhibit larger absolute peak values at points 616, 618, 626, and 628 when compared to corresponding handwritten text lines 630 and 640 at points 636, 638, 646, and 648, respectively.

In addition, the derivative function is also a function of the length of the text line. Since text line 610 is machine printed and contains many letter characters, it exhibits a high peak for its derivative function 616 and 618. The absolute peak values (at points 616 and 618) of the derivative function for projection profile 615 are larger than the absolute peaks (at points 626 and 628) of the derivative function for projection profile 625 that is associated with a smaller machine text line 620.

Derivative functions for the handwritten text lines 630 and 640 show peak values that have lesser peak values than its corresponding machine printed text lines 610 and 620, respectively. For example, the peak values (at points 636 and 638) of the derivative function for the projection profile 635 for the handwritten text line 630 is less than the peak values (at points 616 and 618) of the derivative function for projection profile 615 for the machine printed text line 610. Also, the peak values (at points 646 and 648) of the derivative function of the projection profile 645 for the handwritten text line 640 is less than the peak values (at points 626 and 628) of the derivative function for the projection profile 625 for the machine printed text line 620.

In general, the maximal derivative slope values will define the x-height lines and the baselines of each of the text lines within a sample document. In addition, the maximal derivative values of all the machine printed text lines will generally be greater than the derivative values of the all the handwritten text lines. As such, returning back to the flow chart 400 of FIG. 4, the present embodiment is able to identify text lines of the first and second type by setting a threshold slope value. Absolute slope values greater than said threshold slope value indicate the x-height lines and baselines of the plurality of text lines of said first type (e.g., machine printed text lines). Correspondingly, absolute slope values less than said threshold slope value indicate x-height lines and baselines of the plurality of text lines of said second type (handwritten text lines).

In one embodiment, the threshold slope value is calculated by arranging the set of maximum absolute slope values from the plurality of slope values from minimum slope values to maximum slope values. In this way, the text lines of the first type (e.g., machine printed text lines) are represented with the greater slope values, and the text lines of the second type (e.g., handwritten text lines) are represented with the lesser slope values. As such, a first Gaussian distribution of slope values is associated with the plurality of text lines of a first type, and a second Gaussian distribution is associated with the plurality of text lines of a second type. The threshold slope value is set between the first and second said Gaussian distributions.

In another embodiment, the text lines of the first type (e.g., machine printed text lines) can be verified by first calculating a global skew angle of the plurality of text lines of said first type. Thereafter, the angles ox that are associated with the maximum absolute slope values angles that are greater than the threshold slope value should be approximately equal to the global skew angle and should indicate text lines of the first type.

Figure 7:
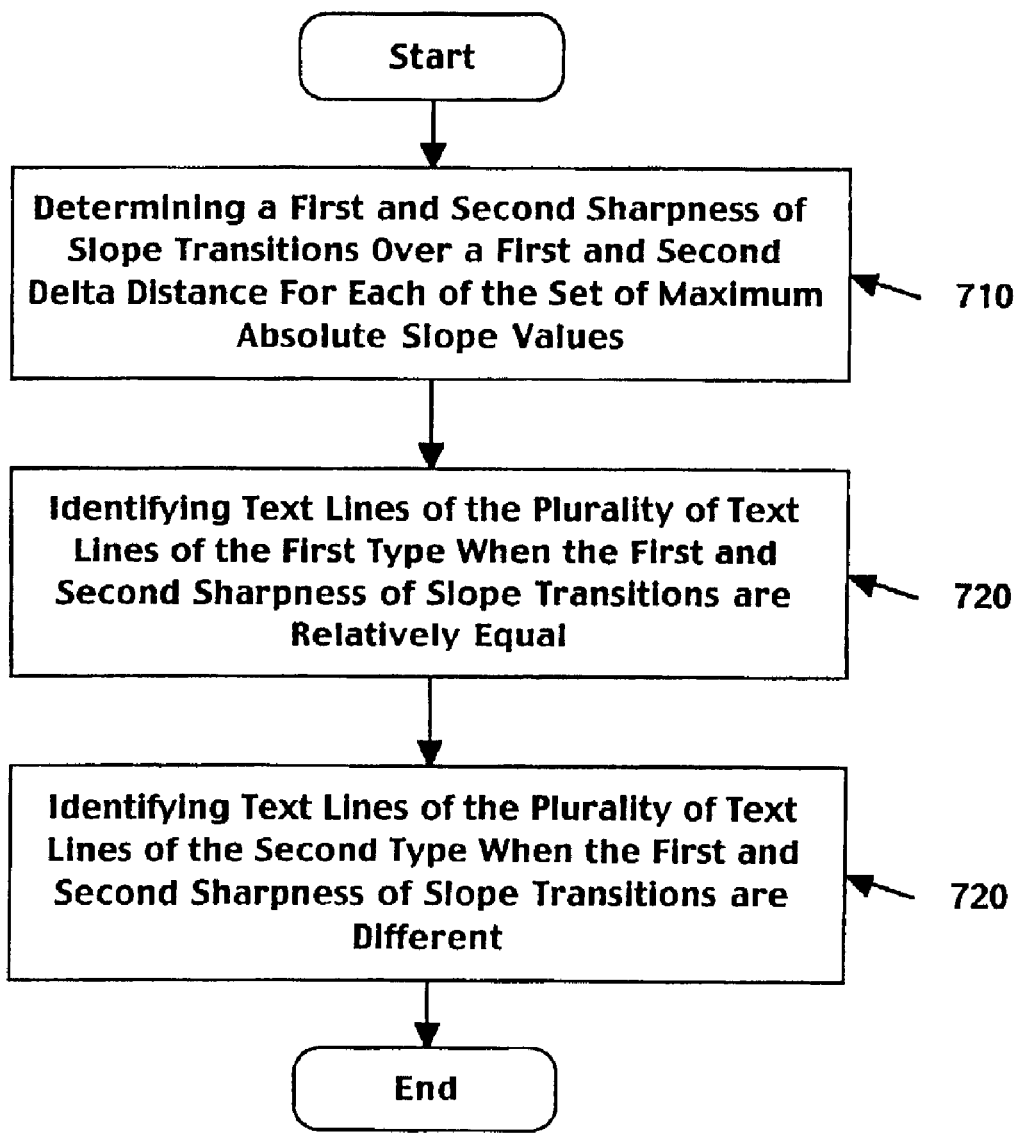
FIG. 7 is a flow diagram illustrating steps in a method of determining the sharpness of slope transitions over a first and second delta distance, in accordance with one embodiment of the present invention.

FIG. 7 is a flow chart 700 illustrating steps in a method of distinguishing between text lines of a first type (e.g., machine printed text lines) and text lines of a second type (e.g., handwritten text lines). When determining the first derivative of the projection profiles of the text lines in FIG. 6A, some derivative values associated with machine printed text lines and handwritten text lines may be approximately equal. For example, the peak values of the derivative function of a short machine printed text line may equal the peak value of the derivative function of a long handwritten text line. The peak values (at points 626 and 628) of the derivative function for the projection profile 625 and the peak values (at points 636 and 638) of the derivative function for the projection profile 635 illustrate just this case.

The present embodiment further distinguishes machine printed text lines from handwritten text lines by examining the sharpness of the slope transitions of the various text lines. The present embodiment begins by determining a first sharpness of the slope transition as determined in flow chart 400 of an associated text line over a first delta distance, in step 710. The present embodiment then determines a second sharpness of the slope transition of the same associated text line over a second delta distance. This is accomplished for each of the text lines as defined by the set of maximum absolute slope values. In one embodiment, the second delta distance is greater than the first delta distance.

The present embodiment then proceeds by comparing the first and second sharpness of slope transitions. In step 720, machine printed text lines are identified when the first and second sharpness of slope transitions are relatively equal.

The present embodiment then proceeds to step 730, where handwritten text lines are identified when the first and second sharpness of slope transitions are different.

Figure 8A:
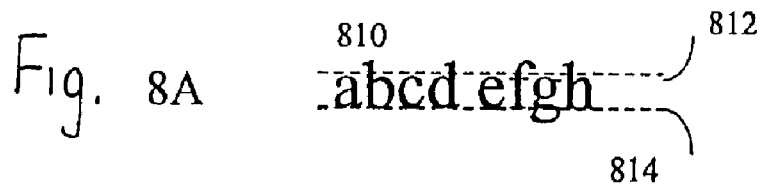
FIG. 8A is a diagram of an exemplary machine printed text line, in accordance with one embodiment of the present invention.
Figure 8B:
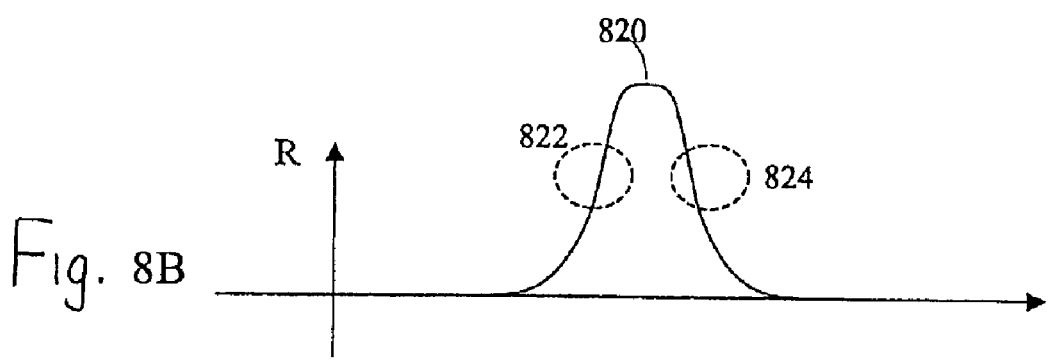
FIG. 8B is a diagram of the slope values for the machine printed text line of FIG. 8A, in accordance with one embodiment of the present invention.

FIGS. 8A–D and 9A–D illustrate the distinction between the slope transitions for machine printed text lines and handwritten text lines. FIG. 8A illustrates a machine printed text line 810. FIG. 8B is the projection profile 820 for the text line 810 taken along an associated angle α.

Figure 8C:
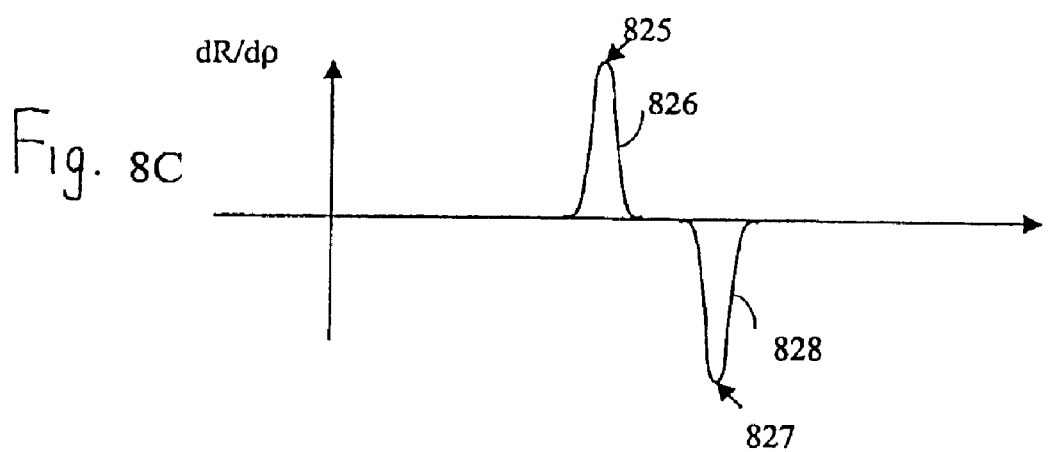
FIG. 8C is a diagram of the sharpness of slope transitions of the slope values of FIG. 8B, in accordance with one embodiment of the present invention.

In FIG. 8C, the slope values of the x-height line 812 and baseline 814 of the associated machine printed text line 810 is shown as a function of the first derivative. The positive slope illustrated by highlighted area 822, and represented as a peak value 825 of the derivative function 826, shows the position of the x-height line 812. Correspondingly, the negative slope illustrated by the highlighted area 824, and represented as a peak value 827 in the derivative function 828, shows the position of the baseline 814. FIG. 8C illustrates the uniformity of the machine printed text line and steepness of the slopes values that define the x-height line 812 and the baseline 814.

Figure 8D:
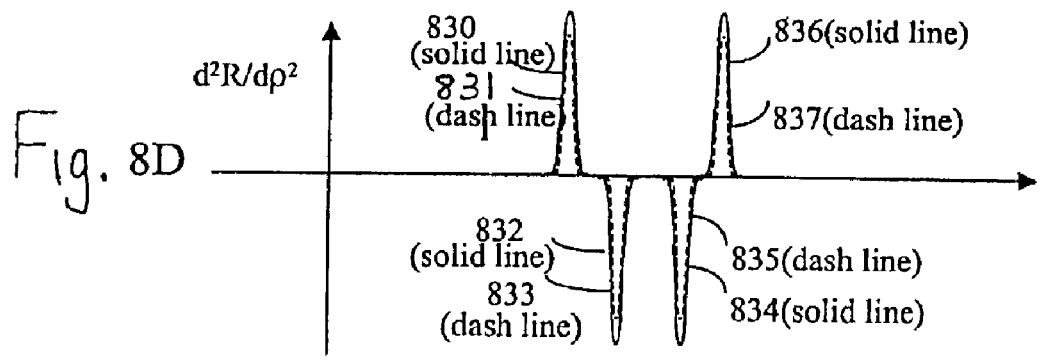

FIG. 8D illustrates the sharpness of the slope transitions for the text line 810 of FIG. 8A. The first sharpness of transition is calculated over a first delta distance (e.g., 2–3 pixels) and is illustrated by the dotted lines 831, 833, 835, and 837. The second sharpness of transition function is calculated over a second delta distance (e.g., 10 pixels) and is illustrated by the solid lines 830, 832, 834, and 836. For machine printed text lines, the first and second sharpness of transitions are relatively equal since the edges that define the x-height line and the baseline are very sharp.

Figure 9A:
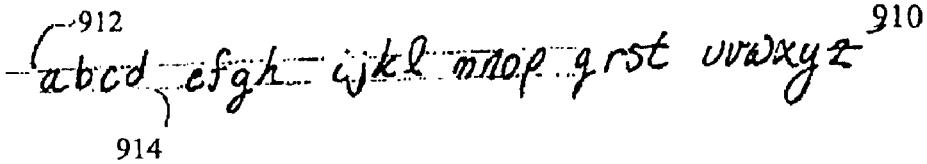
FIG. 9A is a diagram of an exemplary handwritten text line, in accordance with one embodiment of the present invention.
Figure 9B:
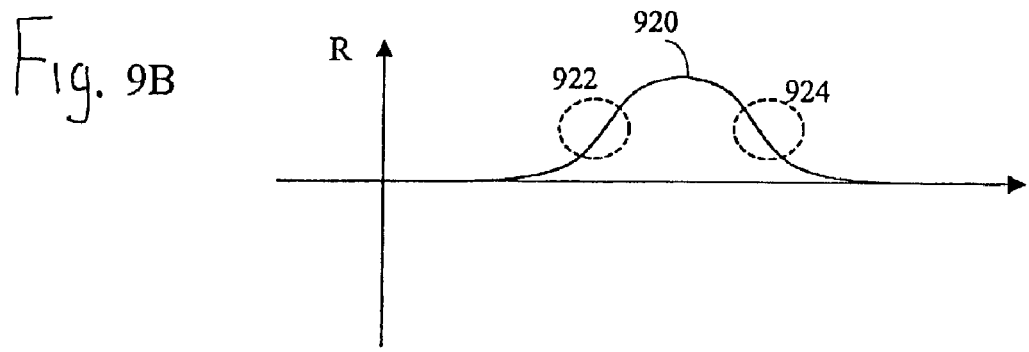
FIG. 9B is a diagram of the slope values for the handwritten text line of FIG. 8A, in accordance with one embodiment of the present invention.
Figure 9C:
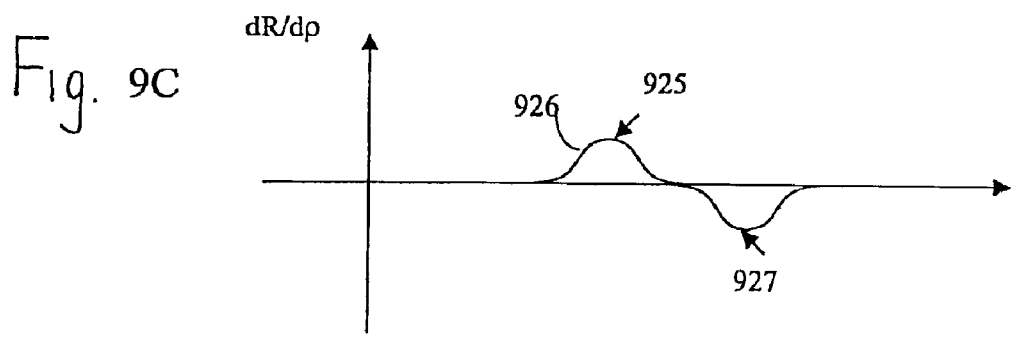
FIG. 9C is a diagram of the sharpness of slope transitions of the slope values of FIG. 8B, in accordance with one embodiment of the present invention.

FIG. 9A illustrates a handwritten text line 910. FIG. 9B is the projection profile 920 for the text line 910 taken at an associated angle α. In FIG. 9C, the slope values of the x-height line 912 and baseline 914 of the associated handwritten text line 910 is shown as a function 926 of the first derivative of the projection profile 920. The positive slope illustrated by highlighted area 922, and represented as a peak value 925, shows the position of the x-height line 912. Correspondingly, the negative slope illustrated by the highlighted area 924, and represented as a peak value 927, shows the position of the baseline 914.

The absolute peak values of the first derivative function in FIG. 9C is approximately equal to the absolute peak values of the first derivative function of FIG. 8C, thereby necessitating the delta peak analysis of the first derivative functions. FIG. 9C illustrates the non-uniformity of the handwritten text line 910 since the first derivative function as shown in FIG. 9C is not as steep as the derivative function as shown in FIG. 8C of the machine printed text line 810.

Figure 9D:
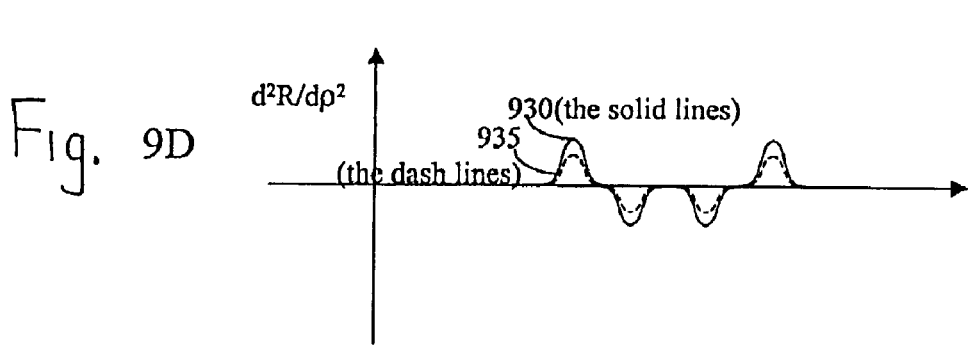

FIG. 9D illustrates the sharpness of the slope transitions for the text line 910 of FIG. 9A. The first sharpness of transition is calculated over the same first delta distance (e.g., 2–3 pixels) used on the machine printed text line 810 and is illustrated by the dotted line 935. The second sharpness of transition function is calculated over the same second delta distance (e.g., 10 pixels) and is illustrated by the solid line 930. For hand printed text lines, the first and second sharpness of transitions are different since the edges that define the x-height line and the baseline are not as well defined.

In one embodiment, the sharpness of transition is determined from the second derivative of the projection profile as determined in FIG. 4. In another embodiment, the sharpness of transition is determined from taking the difference of two first derivative values calculated between the delta distance (e.g., first or second delta distance).

In another embodiment, once the text lines of a first type and of a second type are identified, a third type of data (e.g., text lines or graphics) can be identified by eliminating the information corresponding to the text lines of the first type and the text line of the second type. In one embodiment, the third type of data is determined by setting a second threshold slope value. Maximum absolute slope values that are less than the second threshold slope value indicates one of said third type of text lines or graphics.

The preferred embodiment of the present invention, a method for document segmentation, is thus described. While the present invention has been described in particular embodiments, it should be appreciated that the present invention should not be construed as limited by such embodiments, but rather construed according to the below claims.

What is claimed is:

1. A method of document segmentation comprising:
   a) generating a plurality of projection profiles of pixel intensities for a document containing a plurality of text lines including a plurality of text lines of a first type and a plurality of text lines of a second type over a range of angles;
   b) calculating a plurality of slope values of said plurality of projection profiles for a plurality of discrete distances perpendicular to said range of angles;
   c) sorting out a set of maximum absolute slope values of said plurality of slope values; and
   d) identifying text lines of said first and second type by setting a threshold slope value wherein absolute slope values greater than said threshold slope value indicate said plurality of text lines of said first type, and absolute slope values less than said threshold slope value indicate said plurality of text lines of said second type.

2. The method of document segmentation as described in claim 1, wherein a) further comprises:
   calculating a plurality of Hough transforms for said plurality of projection profiles in two dimensions including said range of angles and said plurality of discrete distances.

3. The method of document segmentation as described in claim 2, wherein b) further comprises:
calculating a plurality of first derivatives of said plurality of Hough transforms for said plurality of discrete distances over said range of angles.

4. The method of document segmentation as described in claim 3, wherein c) further comprises:
for each of said plurality of discrete distances, sorting out a maximum absolute slope value first derivative over said range of angles, said maximum absolute slope value first derivative corresponding to a local skew angle of an associated text line.

5. The method of document segmentation as described in claim 4, further comprising:
calculating a global skew angle of said plurality of text lines of said first type; and
verifying slope angles corresponding to said set of maximum absolute slope values that are greater than said threshold value are associated with said plurality of text lines of a first type by comparing said slope angles to said global skew angle.

6. The method of document segmentation as described in claim 1, wherein d) further comprises:
arranging said set of maximum absolute slope values of said plurality of slope values from minimum slope values to maximum slope values;
locating a first Gaussian distribution of associated with said plurality of text lines of a first type;
locating a second Gaussian distribution of said plurality of text lines of a second type; and
setting said threshold slope value between said first and second Gaussian distributions.

7. The method of document segmentation as described in claim 1, wherein d) further comprises:
pairing said plurality of slope values to indicate x-height lines and baselines of said plurality of text lines.

8. The method of document segmentation as described in claim 1, further comprising:
scanning said document to obtain a digital image of said document comprising a plurality of pixels, said scanning performed before said performing said plurality of projection profiles.

9. The method of document segmentation as described in claim 1, wherein said plurality of text lines of a first type comprise a plurality of text lines of machine printed text, and said plurality of text lines of a second type comprise a plurality of text lines of handwritten annotations.

10. The method of document segmentation as described in claim 1, wherein text lines of said first type are more uniform than text lines of said second type.

11. A method of document segmentation comprising:
a) generating a plurality of projection profiles of pixel intensities for a digitized document containing a plurality of text lines including a plurality of handwritten text lines and a plurality of machine printed text lines over a range of angles;
b) calculating a plurality of slope values of said plurality of projection profiles for a plurality of discrete distances perpendicular to said range of angles;
c) sorting out a set of maximum absolute slope values of said plurality of slope values, said set of maximum absolute slope values associated with a plurality of local skew angles for said plurality of handwritten text lines and said plurality of machine printed text lines; and d) identifying said plurality of machine printed text lines and said plurality of handwritten text lines by setting a threshold absolute slope value, wherein a first maximum absolute slope value greater than said threshold slope value indicates one of said plurality of machine printed text lines and a second maximum absolute slope value less than said threshold absolute slope value indicates one of said plurality of handwritten text lines.

12. The method of document segmentation as described in claim 11, wherein a) further comprises:
calculating a plurality of Hough transforms for said plurality of projection profiles as a function of said range of angles and said plurality of discrete distances.

13. The method of document segmentation as described in claim 12, wherein b) further comprises:
calculating a plurality of first derivatives of said plurality of Hough transforms for said plurality of discrete distances over said range of angles.

14. The method of document segmentation as described in claim 12, wherein d) further comprises:
d1) determining a first and second sharpness of slope transitions over a first delta distance and a second delta distance for each of said set of maximum absolute slope values, wherein said second delta distance is greater than said first delta distance;
d2) identifying text lines of said plurality of machine printed text lines when said first and second sharpness of slope transitions are relatively equal; and
d3) identifying text lines of said plurality of handwritten text lines when said first and second sharpness of slope transitions are different.

15. The method of document segmentation as described in claim 14, wherein d1) further comprises:
calculating second derivatives of an associated Hough transform over said first delta distance and said second delta distance.

16. The method of document segmentation as described in claim 11, wherein d) further comprises:
pairing said plurality of slope values to indicate x-height lines and baselines of said plurality of text lines.

17. The method of document segmentation as described in claim 16, wherein said x-height lines of said plurality of text lines are associated with maximum absolute slope values that were originally positive.

18. The method of document segmentation as described in claim 16, wherein said baselines of said plurality of text lines are associated with maximum absolute slope values that were originally negative.

19. The method of document segmentation as described in claim 11, wherein d) further comprises:
identifying a second plurality of text lines of a type different than said machine printed text lines and said handwritten text lines by setting a second threshold absolute slope value, wherein a third maximum absolute slope value less than said second threshold slope value indicates one of said second plurality of text lines.

20. A computer system comprising:
a processor: and
a computer readable memory coupled to said processor and containing program instructions that, when executed, implement a method of document segmentation comprising:
a) generating a plurality of projection profiles of pixel intensities for a document containing a plurality of text lines including a plurality of text lines of a first type and a plurality of text lines of a second type over a range of angles;

b) calculating a plurality of slope values of said plurality of projection profiles for a plurality of discrete distances perpendicular to said range of angles;

c) sorting out a set of maximum absolute slope values of said plurality of slope values; and d) identifying text lines of said first and second type by setting a threshold slope value wherein absolute slope values greater than said threshold slope value indicate said plurality of text lines of said first type, and absolute slope values less than said threshold slope value indicate said plurality of text lines of said second type.

21. The computer system as described in claim 20, wherein a) in said method further comprises:

calculating a plurality of Hough transforms for said plurality of projection profiles in two dimensions including said range of angles and said plurality of discrete distances.

22. The computer system as described in claim 21, wherein b) in said method further comprises:

calculating a plurality of first derivatives of said plurality of Hough transforms for said plurality of discrete distances over said range of angles.

23. The computer system as described in claim 22, wherein c) in said method further comprises:

for each of said plurality of discrete distances, sorting out a maximum absolute slope value first derivative over said range of angles, said maximum absolute slope value first derivative corresponding to a local skew angle of an associated text line.

24. The computer system as described in claim 23, wherein said method further comprises:

calculating a global skew angle of said plurality of text lines of said first type; and verifying slope angles corresponding to said set of maximum absolute slope values that are greater than said threshold value are associated with said plurality of text lines of a first type by comparing said slope angles to said global skew angle.

25. The computer system as described in claim 20, wherein d) in said method further comprises:

arranging said set of maximum absolute slope values of said plurality of slope values from minimum slope values to maximum slope values;

locating a first Gaussian distribution of associated with said plurality of text lines of a first type;

locating a second Gaussian distribution of said plurality of text lines of a second type; and setting said threshold slope value between said first and second Gaussian distributions.

26. The computer system as described in claim 20, wherein d) in said method further comprises:

pairing said plurality of slope values to indicate x-height lines and baselines of said plurality of text lines.

27. The computer system as described in claim 20, wherein said method further comprises:

scanning said document to obtain a digital image of said document comprising a plurality of pixels, said scanning performed before said performing said plurality of projection profiles.

28. The computer system as described in claim 20, wherein said plurality of text lines of a first type comprise a plurality of text lines of machine printed text, and said plurality of text lines of a second type comprise a plurality of text lines of handwritten annotations.

29. The computer system as described in claim 20, wherein text lines of said first type are more uniform than text lines of said second type.

* * * * *